United States Patent
Dasgupta et al.

(10) Patent No.: US 7,868,738 B2
(45) Date of Patent: Jan. 11, 2011

(54) DEVICE SIMULATOR FRAMEWORK FOR AN RFID INFRASTRUCTURE

(75) Inventors: Koushik Dasgupta, Hyderabad (IN); Bhola R. Meena, Rajasthan (IN)

(73) Assignee: Microsoft Corporation, Redmond, WA (US)

( * ) Notice: Subject to any disclaimer, the term of this patent is extended or adjusted under 35 U.S.C. 154(b) by 420 days.

(21) Appl. No.: 11/460,840

(22) Filed: Jul. 28, 2006

(65) Prior Publication Data

US 2008/0001713 A1 Jan. 3, 2008

(30) Foreign Application Priority Data

Jun. 15, 2006 (IN) .................. 1424/DEL/2006

(51) Int. Cl.
*H04Q 5/22* (2006.01)
(52) U.S. Cl. .............. 340/10.32; 340/825.52; 340/572.1; 340/679
(58) Field of Classification Search .......... 340/10.32, 340/825.52, 679, 506, 572.1–572.9; 235/451, 235/492
See application file for complete search history.

(56) References Cited

U.S. PATENT DOCUMENTS

| | | | |
|---|---|---|---|
| 4,977,607 A | 12/1990 | Maucksch | |
| 5,339,087 A | 8/1994 | Minarik | |
| 5,428,530 A | 6/1995 | Burke | |
| 5,650,768 A | 7/1997 | Eswaran | |
| 5,787,271 A * | 7/1998 | Box et al. | 714/4 |
| 5,812,394 A * | 9/1998 | Lewis et al. | 700/17 |
| 5,910,776 A | 6/1999 | Black | |
| 6,058,261 A | 5/2000 | Rapeli | |
| 6,104,291 A | 8/2000 | Beauvillier | |
| 6,405,261 B1 | 6/2002 | Gaucher | |
| 6,631,363 B1 | 10/2003 | Brown et al. | |
| 6,677,852 B1 * | 1/2004 | Landt | 340/10.1 |
| 6,732,923 B2 * | 5/2004 | Otto | 235/383 |
| 6,784,802 B1 | 8/2004 | Stanescu | |
| 6,892,052 B2 | 5/2005 | Kotola | |
| 6,908,034 B2 | 6/2005 | Alleshouse | |
| 6,943,683 B2 | 9/2005 | Perret | |
| 7,155,305 B2 | 12/2006 | Hayes et al. | |
| 7,204,409 B2 | 4/2007 | Kumar et al. | |
| 7,267,275 B2 * | 9/2007 | Cox et al. | 235/451 |

(Continued)

FOREIGN PATENT DOCUMENTS

EP 11632893 3/2006

(Continued)

OTHER PUBLICATIONS

European Search Report dated Feb. 6, 2006, mailed Feb. 6, 2006 for EP Appln. Serial No. 05107826, 7 pages.

(Continued)

*Primary Examiner*—Daniel Previl
(74) *Attorney, Agent, or Firm*—Turocy & Watson, LLP

(57) ABSTRACT

The claimed subject matter provides a system and/or a method that facilitates simulating one or more devices respective to disparate vendors, wherein the devices can be associated with an RFID infrastructure. A physical device can wirelessly receive data from a tag. A device simulator can employ a virtual replication of the physical device to simulate the physical device within an RFID network allowing the device to be virtually represented as if physically within the RFID network.

19 Claims, 13 Drawing Sheets

U.S. PATENT DOCUMENTS

| | | | |
|---|---|---|---|
| 7,289,027 B2 * | 10/2007 | Hunt et al. | 340/572.1 |
| 7,496,486 B1 * | 2/2009 | Tracey et al. | 703/6 |
| 7,570,164 B2 * | 8/2009 | Chakraborty et al. | 340/572.1 |
| 2002/0059471 A1 | 5/2002 | Sanghvi et al. | |
| 2002/0070865 A1 | 6/2002 | Lancos et al. | |
| 2002/0170952 A1 | 11/2002 | Alsafadi et al. | |
| 2003/0088390 A1 | 5/2003 | Jamsa | |
| 2003/0135576 A1 | 7/2003 | Bodin | |
| 2003/0144926 A1 | 7/2003 | Bodin et al. | |
| 2003/0182027 A1 | 9/2003 | Mocek | |
| 2003/0225928 A1 | 12/2003 | Paul | |
| 2003/0227392 A1 | 12/2003 | Ebert et al. | |
| 2004/0046642 A1 * | 3/2004 | Becker et al. | 340/10.32 |
| 2004/0070491 A1 | 4/2004 | Huang et al. | |
| 2004/0088628 A1 | 5/2004 | Poutanen | |
| 2004/0111335 A1 | 6/2004 | Black et al. | |
| 2004/0160233 A1 | 8/2004 | Forster | |
| 2004/0193641 A1 | 9/2004 | Lin | |
| 2004/0215667 A1 | 10/2004 | Taylor et al. | |
| 2005/0062603 A1 | 3/2005 | Fuerst et al. | |
| 2005/0092825 A1 | 5/2005 | Cox et al. | |
| 2005/0150952 A1 | 7/2005 | Chung | |
| 2005/0150953 A1 | 7/2005 | Alleshouse | |
| 2005/0154570 A1 * | 7/2005 | Sweeney | 703/13 |
| 2005/0154572 A1 * | 7/2005 | Sweeney | 703/13 |
| 2005/0237194 A1 | 10/2005 | VoBa | |
| 2005/0240369 A1 | 10/2005 | Diorio | |
| 2005/0269407 A1 | 12/2005 | Harmon | |
| 2006/0043165 A1 | 3/2006 | Kumar et al. | |
| 2006/0047464 A1 | 3/2006 | Kumar et al. | |
| 2006/0047545 A1 | 3/2006 | Kumar et al. | |
| 2006/0047646 A1 | 3/2006 | Maluf et al. | |
| 2006/0047787 A1 | 3/2006 | Agarwal et al. | |
| 2006/0047789 A1 | 3/2006 | Kumar et al. | |
| 2006/0053234 A1 | 3/2006 | Kumar et al. | |
| 2006/0055508 A1 | 3/2006 | Kumar et al. | |
| 2006/0058987 A1 | 3/2006 | Kumar et al. | |
| 2007/0205861 A1 * | 9/2007 | Nair et al. | 340/5.61 |

FOREIGN PATENT DOCUMENTS

| | | |
|---|---|---|
| WO | 2003102845 | 12/2003 |
| WO | 2005078633 | 8/2005 |

OTHER PUBLICATIONS

European Search Report dated Oct. 4, 2005, mailed Apr. 11, 2006 for EP Appln. Serial No. 05108005, 9 pages.
European Search Report dated Oct. 2, 2005, mailed Feb. 10, 2006 for EP Appln. Serial No. 05107796, 6 pages.
IBM."alphaWorks: RFID Device Development Kit: Overview" http://www/alphaworks.ibm.com/tech/rfiddevice last viewed Nov. 7, 2005, 1 page.
Alien "ALR-9800 Enterprise RFID Reader" http://www.alientechnology.com/docs/AT_DS_9800v3_WEB.pdf last viewed Nov. 7, 2005, 4 pages.
Tsetsos, et al. "Commercial Wireless Sensor Networks: Technical and Business Issues" Proceedings of the Second Annual Conference on Wireless On-Demand Network Systems and Services (Jan. 19-21, 2005) 8 pages.
Branch, et al. "Sentire: A Framework for Building Middleware for Sensor and Actuator Networks" Proceedings of the Third International Conference on Pervasive Computing and Communications Workshops (Mar. 8, 2005) pp. 396-400.
Harrison, et al. "Information Management in the Product Lifecycle—the Role Networked RFID" Proceedings of the Second IEEE International Conference (Jun. 24, 2004) pp. 507-512.
Bornhovd, et al. "Integrating Smart Items with Business Processes An Experience Report" Proceedings of the Thirty-Eighth Hawaii International Conference on System Science (Jan. 3, 2005) 8 pages.
Ganesh, et al. "Web Services and Multi-Channel Integration: A Proposed Framework" Proceedings of the IEEE International Conference on Web Services (Jul. 6, 2004) 8 pages.
Ortiz. "An Introduction to Java Card Technology-Part1" http://developers.sun.com/techtopics/mobility/javacard/articles/javacard1/> last viewed Dec. 19, 2005, 14 pages.
Chen. "Understanding Java Card 2.0" URL:.com/javaworld/jw-03-javadev_p.html> last viewed Dec. 19, 2005, 12 pages.
Annonymous. "The Sun Global RFID Network Vision: Connecting Business at the Edge of Network" http://www.sun.com/software/solutions/rfid/Sun_RFIS_Vison_rla.pdf Jul. 2004.
European Search Report dated Mar. 9, 2006, mailed Mar. 27, 2006 for European Patent Application Serial No. EP05107794, 5 pages.
European Search Report dated Feb. 7, 2006, mailed Feb. 7, 2006 for European Patent Application Serial No. EP05108001, 7 pages.
European Search Report dated May 11, 2006, mailed May 12, 2006 for European Patent Application Serial No. EP05107744, 7 pages.
International Search Report dated and mailed Jul. 27, 2007 for PCT Application Serial No. PCT 2007/004005, 6 pages.
Floerkemier, et al. "PML Core Specification 1.0" Sep. 13, 2003, Auto-ID Center, Version 1.0, 48 pages.
Arnold et al. "Hybrid multichannel hardware simulator for frequency-selective mobile radio paths" http://md1.csa.com/partners/viewrecord.php requester=gs&collection=TRD&recid=0507210CI&recid=0507210EA&q=simulator+for+radio+frequency&uid=1000214&setcookie=yes; IEEE Transactions on Communications. vol. COM-31, No. 3, pp. 370-377. 1983.
NFC Forum, http://www.nfc-forum.org/home;2005.
EPC global Inc™, http://www.epcglobalinc.org/; 2005.
Jones et al. "RFID Training Simulator", http://www.unl.edu/rfscl/Publications/RFID%20Simulator.pdf.

* cited by examiner

DEVICE SIMULATOR FRAMEWORK FOR AN RFID INFRASTRUCTURE

CROSS REFERENCE TO RELATED APPLICATION(S)

This application claims the benefit of India Patent Application Serial No. 1424/DEL/2006 filed on Jun. 15, 2006, entitled "DEVICE SIMULATOR FRAMEWORK FOR AN RFID INFRASTRUCTURE." The entirety of which application is incorporated herein by reference.

BACKGROUND

Many retail, manufacture, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g. more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

Automatic identification and data capture (AIDC) technology, and specifically, Radio Frequency Identification (RFID) has been developed based at least upon the need to cure deficiencies of typical monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g. distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and an RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz).

In general, an RFID system can include multiple components: tags, tag readers (e.g. tag transceivers), tag writers, tag-programming stations, circulation readers, sorting equipment, tag inventory wands, etc. Moreover, various makes, models, types, and/or applications can be associated with respective components (e.g., tag, tag readers, tag programming stations, circulation readers, sorting equipment, tag inventory wands, . . . ), which can complicate employment of the RFID system and/or components. In order to enhance utilizing RFID systems and/or components within an environment, various testing systems can be utilized. Software application testing systems and/or simulations have been around for quite some time, wherein such testing/simulation systems are fueled by consumer demand for high quality and/or reliable software. Moreover, providing high-end simulations can prove to be extremely valuable in the realm of testing, compatibility, and/or feedback. Thus, with the multitude of components within an RFID system ascertaining test results and/or simulations can be a costly, redundant, and meticulous task.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate simulating a device associated with an RFID infrastructure. A device simulator can simulate a device associated with an RFID network, wherein such simulated device can replicate a physical device that receives wireless data from a tag. The device simulator can provide a virtual replication of the physical device such that the actual physical device need not be within the RFID network. In other words, a physical device can be emulated to represent any device interaction with, for instance, the RFID network, a host, a provider within the host, an RFID process associated with the RFID network, and an RFID server within the host. The device simulator can simultaneously simulate a physical device among disparate devices physically located within the RFID network (e.g. physical RFID architecture).

Furthermore, the device simulator can mimic any device settings (e.g., power levels, frequencies, etc.), device configurations, tag data readings, process interaction, an RFID process role, a tag notification, management events, commands related to a particular device, a device property, a tag management, a TCP connection management, a read filter management, an IO ports management, etc. In addition, the device simulated and/or the physical device can be, but not limited to, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system.

In accordance with one aspect of the claimed subject matter, the device simulator can include at least one of a wire protocol and a device setting. The device simulator can provide virtual representation for any physical device that can be utilized with the RFID network. Each device can be related to a make, model, brand, type, functionality, etc. such that an RFID server within a host can communicate to the particular device via a provider. The device simulator can simulate such interaction by utilizing at least a wire protocol and a device setting. In accordance with another aspect of the subject innovation, the device simulator can further utilize a plug-in that allows for expansion to future devices. The plug-in can provide updates, upgrades related to, for instance, versions, devices to simulate, device settings, software, wire protocols, etc.

In accordance with another aspect of the claimed subject matter, the device simulator can utilize a universal connection that facilitates the receipt of data associated with a physical device to simulate. The universal connection (e.g., a serial port, a universal serial port, a parallel port, Firewire, Bluetooth, wireless communication, near-field communication (NFC), etc.) can be implemented to communicate with a device, wherein such communication can upload data to simulate and/or virtual replicate the device (e.g., device settings, wire protocols, etc.). In other aspects of the claimed subject matter, methods are provided that facilitates utilizing a virtual device to simulate a physical device associated with an RFID network.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
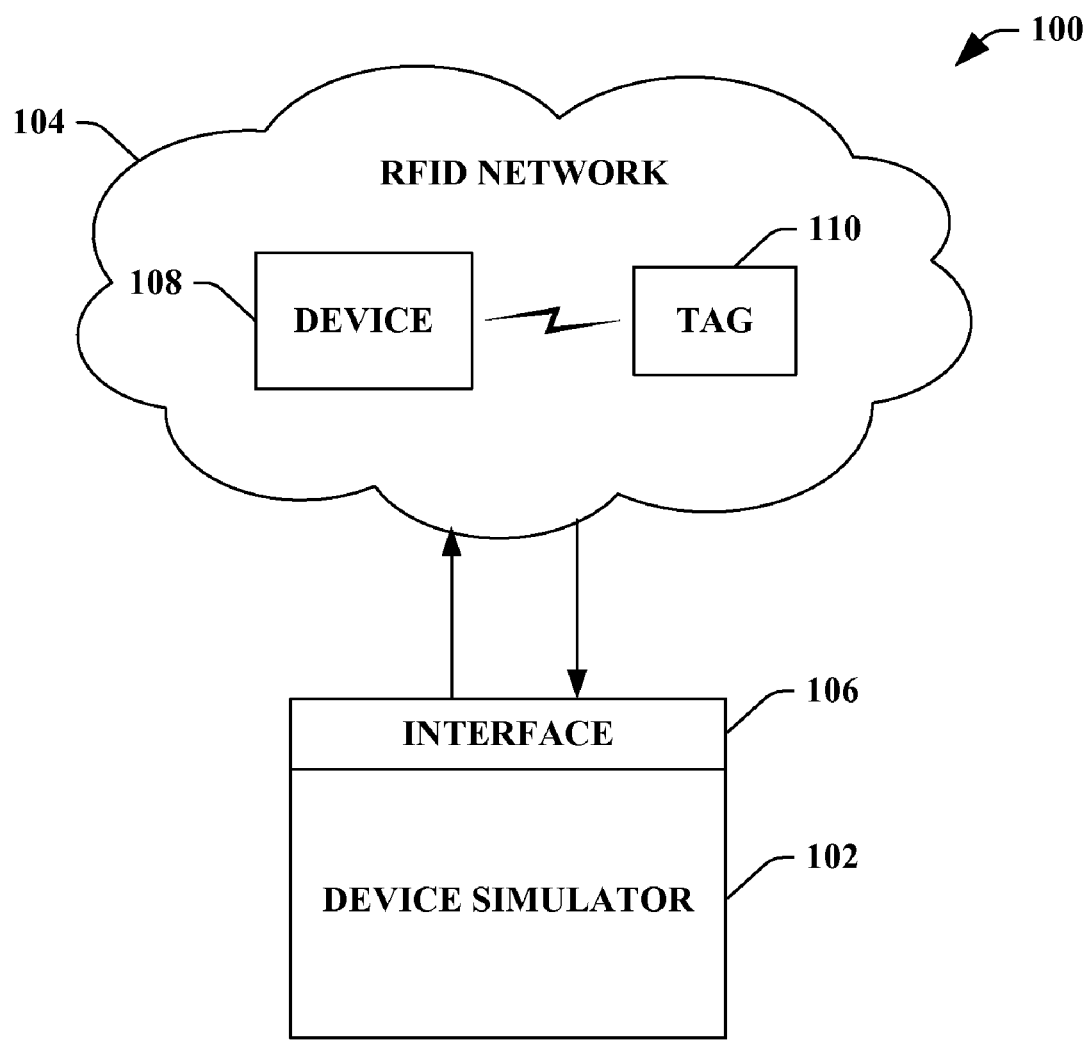
FIG. 1 illustrates a block diagram of an exemplary system that facilitates simulating a device associated with an RFID infrastructure.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "simulator," "plug-in," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates simulating a device associated with an RFID infrastructure. The system 100 can include a device simulator 102 that can simulate any RFID device of any type, wherein the simulation is that of a virtual representation of the physical device. The device simulator 102 can utilize a virtual device to represent a physical representation of a device within an RFID network 104. The RFID network 104 can be a physical architecture related to RFID technology including a device that receives data from a tag 110. Thus, the device simulator 102 can represent/replicate an additional device 108, a disparate device, a plurality of devices (similar and/or disparate to the device 108), and/or any combination thereof within the RFID network 104. Furthermore, the device simulator 102 can mimic any device settings (e.g., power levels, frequencies, etc.), device configurations, tag data readings, process interaction, an RFID process (not shown) role, a tag notification, management events, commands related to a particular device, a device property, a tag management, a TCP connection management, a read filter management, an IO ports management, etc. In addition, the device simulated can be, but not limited to, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. It is to be appreciated that a device (such as device 108) need not be physically present in the RFID network 104 at any time to be simulated.

For example, various devices can exist for employment within the RFID network 104 such that devices have a range of operability. The devices can include a number of makes, models, functionalities, types, versions, sizes, classifications, and/or any other suitable distinction. The device simulator 102 can simulate any of the various devices to replicate the existence and/or physical presence of such device within the RFID network 104. The virtual device can provide feedback and/or data associated with interaction and/or compatibility with at least one of the RFID network 104 and an RFID process (not shown). Thus, the device simulator 102 can simulate devices to enhance and/or improve the RFID network 104, any interaction with the RFID process, other suitable services, and/or an application programming interface (API), etc.

In accordance with one aspect of the claimed subject matter, the device simulator 102 can replicate a device utilizing a virtual representation among physical devices 108 within the RFID network. In other words, the device simulator 102 can provide a virtual representation to simulate a device while other physical devices (such as device 108) are present within the RFID network 104. The RFID network 104 can include physical devices (e.g., device 1, device 2, and device 3) that collect data from various tags such that the network is related to a particular business (e.g., warehouse, shipping department, etc.). The particular business can utilize the device simulator 102 to simulate at least one of the following: an additional device within the RFID network 104; a disparate device model; a different device setting; a change in device operation; a change in device type/functionality; etc. By employing the device simulator 102, the results and effects can be ascertained based on a virtual simulation rather than physical deployment of a device.

It is to be appreciated that the device 108 can receive a signal from, for instance, at least one tag 110 and/or a plurality of tags. In one example, the tag 110 can contain an antenna that provides reception and/or transmission to radio frequency queries from the device 108. Furthermore, it is to be appreciated that the device 108 within the RFID network 104 can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Additionally, although a single device 108 and tag 110 are depicted, it is to be appreciated that a plurality of devices 108 and tags 110 can be utilized with the system 100. Furthermore, the device simulator 102 can simulate the device 108 and/or any interaction with the tag 110 and/or the RFID process.

In one example, the RFID network 104 can include at least one device 108 that is associated with at least one RFID process (not shown). It is to be appreciated that the RFID process can utilize any suitable number of devices 108 within the RFID network 104. An RFID process can be related to a particular RFID sub-system (e.g., an RFID server, RFID network, etc.) that is an uber or high-level object that forms together various entities to create a meaningful unit of execution. The RFID process can be and/or can include an outbound process (e.g. pick, pack, shipping scenario, etc.), a manufacturing process, a shipping process, a receiving process, tracking, data representation, data manipulation, data application, security, etc. Additionally, the RFID process can include and/or respond to a device service, a tag read, an event, a tag write, a device configuration, a geographic tracking, a number count, etc. It is to be appreciated that the process can have raw data collected via at least one device associated with the RFID network 104, wherein such raw data can be manipulated based at least in part upon a rule and/or a business rule engine (not shown). In addition, the device simulator 102 can replicate any communication and/or interaction between the RFID process and the virtual replication of a physical device.

Moreover, the system 100 can include any suitable and/or necessary interface component 106 (herein referred to as "interface 106"), which provides various adapters, connectors, channels, communication paths, etc. to integrate the device simulator 102 into virtually any operating and/or database system(s). In addition, the interface 106 can provide various adapters, connectors, channels, communication paths, etc., that provide for interaction with the device simulator 102, the RFID network 104, the device 108, the tag 110, and any other device and/or component associated with the system 100.

Figure 2:
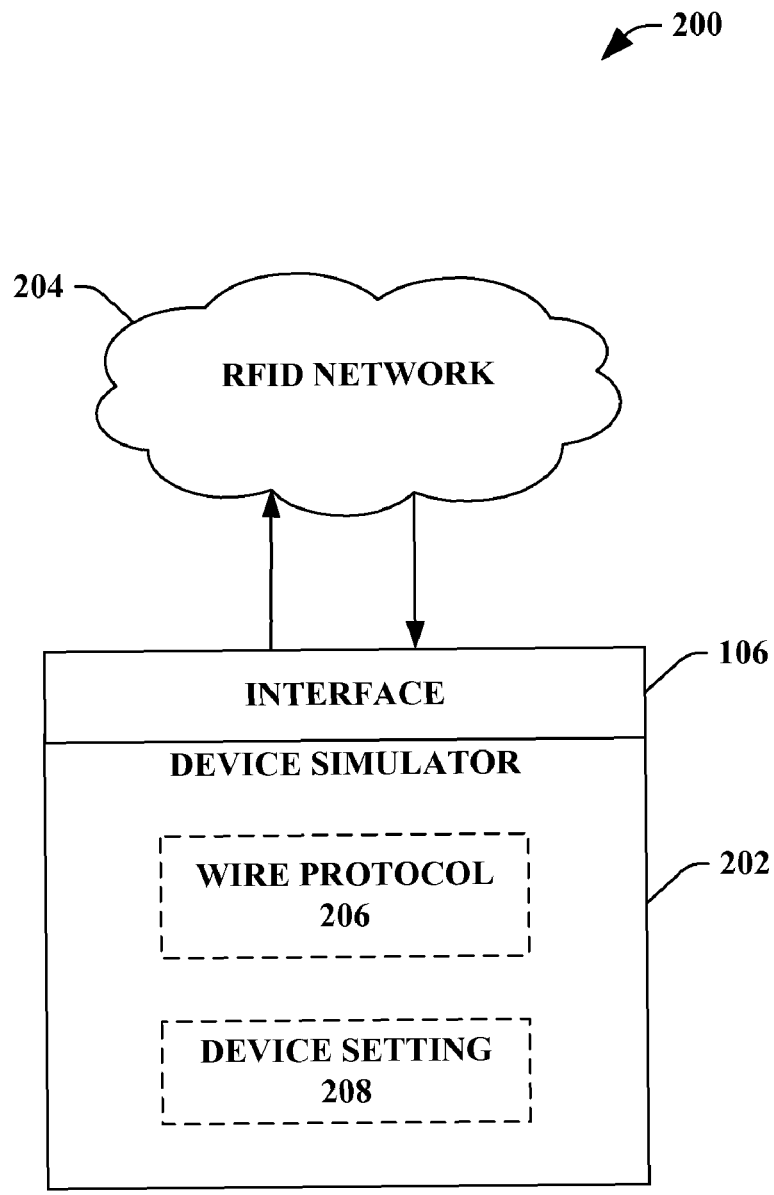
FIG. 2 illustrates a block diagram of an exemplary system that facilitates utilizing a virtual device to simulate a physical device associated with an RFID network.

FIG. 2 illustrates a system 200 that facilitates utilizing a virtual device to simulate a physical device associated with an RFID network. The system 200 can include a device simulator 202 that can simulate an RFID device by utilizing a virtual representation thereof It is to be appreciated that the device can be, but is not limited to, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. The device simulator 202 can ascertain feedback in relation to the presence of a physical device within the RFID network 204 by utilizing the virtual representation allowing a reduction in establishing a physical architecture. It is to be appreciated that the device simulator 202 and the RFID network 204 can be substantially similar to the device similar 102 and the RFID network 104 as depicted in FIG. 1.

For instance, an RFID platform can utilize a rich set of APIs and a service. Using the service and the API, independent software vendors (ISV) and/or system integrators (SI) can develop RFID solutions, processes, applications, etc. that are compatible with any RFID device. The service and the API can be agnostic to different hardware settings/configurations and can work with all devices regardless of the manufacturer and/or hardware vendor. Thus, the device simulator 202 can provide virtual representation for any physical device that can be utilized with the RFID network 204. In other words, the device simulator 202 can mimic any device settings (e.g., power levels, frequencies, etc.), device configurations, tag data readings, process interaction, an RFID process (not shown) role, a tag notification, management events, commands related to a particular device, a device property, a tag management, a TCP connection management, a read filter management, an IO ports management, etc.

In one example, a particular device setting 208 related to a physical device and a respective wire protocol 206 can be emulated by the device simulator 202 to simulate the physical presence of that particular device having such device setting 208 and/or wire protocol 206. In other words, any device (with a respective wire protocol 206 and/or respective device setting 208) can be represented and/or tested by the device simulator 202. In another example in accordance with the subject innovation, the device simulator 202 can include a port to connect to any physical device, wherein such port and/or connection can allow the characteristics of the connected physical device to be simulated, emulated, and/or virtually represented. In other words, a device within the RFID network 204 can be connected and cloned to be virtually represented by the device simulator 202 since any necessary data can be provided during the physical connection via the port and/or interface 106. In addition, the device simulated can be, but not limited to, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system.

Figure 3:
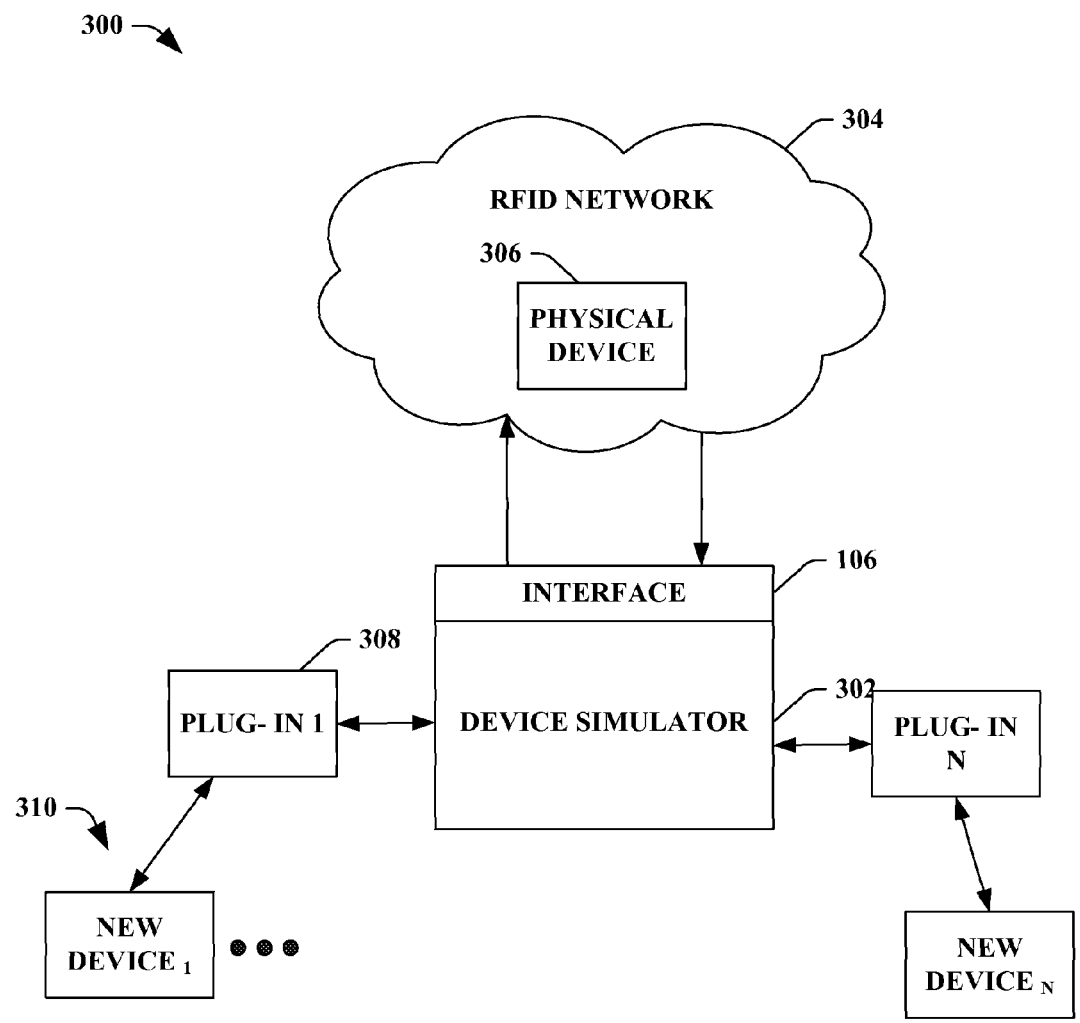
FIG. 3 illustrates a block diagram of an exemplary system that facilitates implementing a device simulator in connection with a physical device and a plug-in device.

FIG. 3 illustrates a system 300 that facilitates implementing a device simulator in connection with a physical device and a plug-in device. The system 300 can include a device simulator 302 that can virtually simulate a device within an RFID network 304 which can allow various data and/or feedback. A physical device 306 can be associated with the RFID network 304, wherein the network can be a physical architecture that can include various devices that can wirelessly communicate with at least one tag. It is to be appreciated that the RFID network 304 can include at least one physical device 306, yet a plurality of devices and/or tags can be employed. The device simulator 302 can simulate a device and act as if physically associated with the RFID network 304 (rather than virtual association). Moreover, the device simulator 302 can simulate an additional device substantially similar to the physical device 306, a disparate device, a device with different settings, and/or any other combination thereof.

The device simulator 302 can further include a plug-in 308 that allows for expansion of the device simulation capability. The plug-in 308 provide adaptability for numerous devices (present and future) such that new devices 310 can be adapted for simulation. It is to be appreciated that the new devices 310 can have any number of new devices such as new device$_1$ to new device$_N$, where N is an integer. For instance, the number, type, model, functionality, brand, etc. of devices that can be utilized within RFID technology is constantly growing and/or developing. By allowing a plug-in 308, the device simulator 302 can adapt to such variety of devices of the present and of the future. In one example, the device simulator 302 can be shipped with a standard template of devices that can be simulated. Upon new developments and/or advances based on hardware vendors, new devices can be released, wherein the plug-in 308 allows upgrades, expansions, and/or new versioning to allow for the device simulator 302 to emulate such new released devices. In other words, the device simulator 302 can utilize various upgrades to adapt to current technological advances in the types and/or various makes of devices.

Following an example described previously, the device simulator 302 can utilize a universal connection (e.g., a serial port, a universal serial port, a parallel port, Firewire, Bluetooth, wireless communication, near-field communication (NFC), etc.) to communicate with a device, wherein such communication can upload data to simulate and/or virtual replicate the device (e.g., device settings, wire protocols, etc.). Utilizing the plug-in 308, the device simulator 302 can communicate with a newly released device via the universal connection and provide data that facilitates simulating the newly released device. It is to be appreciated and understood that the device simulator 308 and/or plug-in 308 can utilize any suitable technique and/or communication port/interface to receive data that facilitates simulating a device.

Figure 4:
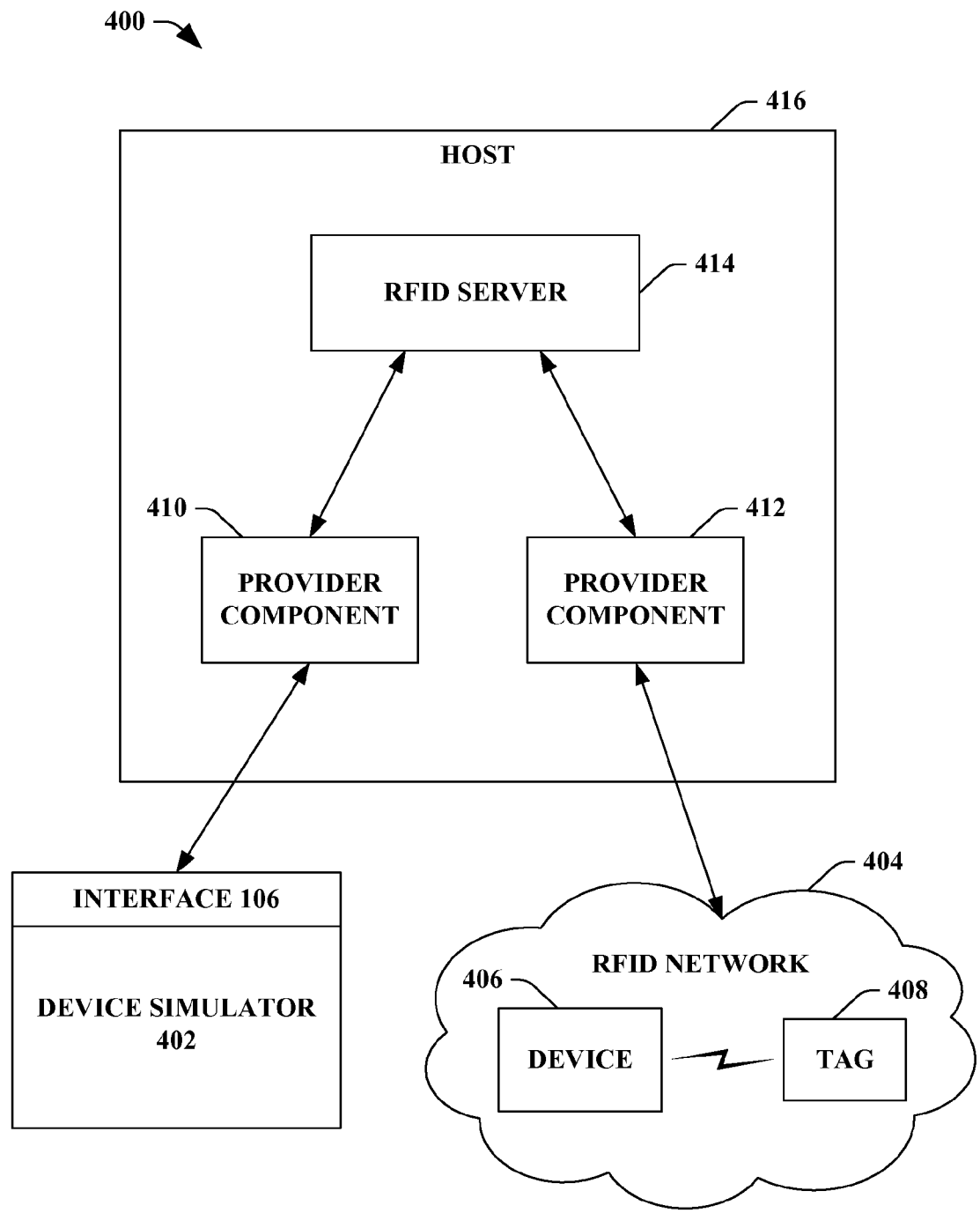
FIG. 4 illustrates a block diagram of an exemplary system that facilitates simulating a device that can be associated with an RFID network and an RFID process.

FIG. 4 illustrates a system 400 that facilitates simulating a device that can be associated with an RFID network and an RFID process. The system 400 can include a device simulator 402 that can provide a virtual replication of a physical device to emulate interaction with at least one of an RFID network 404, a provider 410 (respective to a particular device), a host 416, an RFID server 414, and an RFID process (not shown). The device simulator 402 can simulate any device that can be utilized by the physical architecture associated with the RFID network 404. The RFID network 404 can include a device 406 that can wirelessly communicate with a tag 408 to communicate data associated therewith. The device simulator 402 can provide a virtual representation of an additional physical device (e.g., utilizing one or more devices substantially similar to the device 406), a disparate device, a device with disparate configurations, a device with a disparate wire protocol, and/or any combination thereof. In other words, the device simulator 402 can provide a virtual simulation of a device while also utilizing physical devices within the system 400.

The system 400 can include a provider component 410 and a provider component 412 that can provide communication to devices replicated and devices (e.g., device 406) within the RFID network 404 respectively. The providers (e.g., provider component 410 and provider 412) can employ communications to an RFID network 404 and/or the device simulator 402. In particular, the providers can be implemented by independent hardware vendors, wherein the providers can be loaded into the host 416 allow communication with the device 406 and/or the device simulator 402. For example, the providers can be associated with a particular brand, make, model, function, type, version, size, classification, serial number, and/or any other suitable distinction with respect to the device utilized within the RFID network 404 and/or simulated by the device simulator 402.

The devices 406 can be associated with at least one RFID process. Although only a single RFID process is depicted, it is to be appreciated that a plurality of RFID processes can be executed in conjunction with the RFID network 404. The RFID network 404 can include various sub-systems and/or groups based at least in part upon device location, device functionality, device security level, process device association, make and/or model of device, type of device, device frequency, etc. For example, an RFID network 404 can include two groups and/or collections of devices, one at a shipping door and another at a receiving door. Such RFID network 404 can further include a process associated with each groups and/or collection of devices. For instance, the RFID process can be a shipping process that is related to the devices at the shipping door, wherein the devices can collect data at such location. Similarly, another process can be a receiving process that is related to the devices at the receiving door, wherein the devices can collect data at such location.

Furthermore, the RFID process can be a business process, wherein the devices 406 can be indirectly utilized in association with the business process (not shown). In an example, the RFID stack can bridge the gap between devices 406 and business applications. The business process can be, for instance, a business application to achieve a critical business function. For instance, the business application can be a back end application, an existing business application, a line of business (LOB) application, an accounting application, a supply chain management application, a resource planning application, and/or a business monitoring (BAM) application. In addition, the critical business function can be, for example, a demand plan, a forecast, and/or an inventory control with the incorporation of RFID data in real-time. In another example, an RFID host (e.g., host 416) associated with the RFID network 404 can utilize a business rules engine (not shown), wherein such business rules engine can provide a rule-based system in association with any application related to the RFID network 404 such that a filter and/or alert can be utilized as a rule(s). The business rules engine can execute declarative filters and/or alerts as rules associated with an RFID network 404, wherein the rules can include a rule set adhered to an event, condition, and action format utilizing an extensible markup language (XML). The rule is at least one of the following: contained within a rule set that adheres to an event, a condition, and an action; and represented utilizing an extensible markup language (XML). Moreover, the condition has at least one of a set of predicates and a logical connective to form a logical expression that evaluates to one of a true and a false.

The RFID process can be an uber and/or high-level object that can provide a meaningful unit of execution. For instance, the RFID process can be a shipping process that represents multiple devices at various dock doors working together to perform tag reads, filtering, read enrichment, alert evaluation, and data storage in a sink for a host application to retrieve/process. In another example, the RFID process can execute a manufacturing process, wherein devices are configured to read as well as write dependent upon a location. Moreover, additional functions such as filtering, alerting, enriching, etc. can be implemented at the location. In yet another example, the RFID process can write to a tag process, wherein a tag can be written in real-time based at least upon an input. The write process can also check if the write succeeded by reading and passing data back to the host.

The device simulator 402 can utilize a uniform manner to simulate a device since different vendors implement various command sets, protocols, and/or behavior. The device simulator 402 can employ a device simulator interface (DSI) (not shown) that can be an abstraction layer to communicate with vendor specific plug-ins which can be responsible for responding to commands from a provider (e.g., an entity that facilitates communication with devices), sending notification events, and discovery messages. The device simulator 402 can manage common functionality of a device such as, but not limited to, a device property, a tag management, a TCP connection management, a read filter management, an IO ports management, etc.

The device simulator 402 can define abstract classes (e.g. for handling discovery, notification events, management events, device configuration, communication with a provider, connection management, etc.) that device vendors can implement to simulate devices. In other words, the abstract classes can act as a middle-man layer between the device simulator and the provider loaded in the host 416. In one example, the device simulator 402 can communicate with the provider via a framework, unmanaged code, a COM implementation, an API, etc.

The device simulator 402 can employ the following abstract classes that device vendors can implement to simulate devices: 1) a DeviceTranslator—a main class which can handle vendor specific functions; and 2) DeviceContext—a call back class to device simulator in order to access common device functionalities managed by the device simulator. The device simulator 402 can further implement the following high level features: 1) Command(s) and Response(s)—define the response for commands received from a provider; 2) Notifications—asynchronous set of tag events sent by the translator to provider (e.g. RaiseTagNotification(List<Tag>) function can be invoked for it. Asynchronous set of management events sent by the translator to provider (e.g., RaiseManagementNotification(ManagementEvent) function can be invoked for it); and 3) TCP connection—properties device context class can be used by translator to TCP connection for command-response purpose (e.g., StartListeningOn( ) function will open a TCP server and manage connection from provider side).

The DeviceTranslator can be an entry point class for any device simulator and/or device translator. This can be the first class a provider writer can implement and the device simulator 402 can support this class. The following sections illustrate examples of pseudo code that can be utilized to implement the claimed subject matter. It is to be appreciated that the following code samples are for example and not to be seen as limiting on the subject innovation. It is to be understood that various nuances and/or subtleties can be employed and such minor disparities are to be considered in the subject innovation. The following pseudo code can be utilized to implement the class DeviceTranslator:

```
public abstract class DeviceTranslator
{
    public abstract void Init(DeviceContext deviceContext,
Dictionary<VendorSpecificDataKey, VendorSpecificData>
deviceConfigDatas);
    public abstract void OpenConnection(Transport transport,
TransportSettings transportSettings);
    public abstract void CloseConnection(Transport transport,
TransportSettings transportSettings);
    public abstract void OnCommand(CommandReceivedEventArgs
commandArgs);
    public abstract void RaiseManagementEvent(ManagementEvent
managementEvent);
    public abstract void RaiseNotificationEvent(List<Tag> tagList);
    public abstract void RaiseDiscoveryEvent(DiscoveryEventArgs
discoveryEventArgs);
}
```

The above pseudo code provides device translator initialization and destruction. "public abstract void Init" can be a constructor for device translator and/or device simulator. The function can employ the following action: 1) if vendor supports different channel for notification, then initialize it; 2) if vendor supports differtn channel for management events then initialize it; and 3) initialize discover connection.

The above code further provides connection initiailization by utilizing "public abstract void OpenConnection." This allows the device simulator to start listening on given connection parameters given in arguments so that the provider can connect to the device simulator. The device simulator framework can be used for managing TCP connection for command-response from providers. To start listening on TCP port, the following function of DeviceContext class: "public abstract void StartListeningOn(Transport transport, TransportSettings transportSettings)." Continuing with the above psuedo code, the device connection can be closed by implemting "pbulic abstract void CloseConnection(Transport transport, Trasnsportsettings transportSettings)." Such function can close the command-reponse connection to the device. If TCP connection is managed by device simulator then use the following function of DeviceContext to close it: "public abstract void StopListeningOn(Transport transport, TransportSettings transportSettings)."

The function "RaiseNotificationEvent" can be called for raising tag notification events. The device translator (e.g., device simulator) can send all events present in list. If the device translator is using connection managed by device simulator and it does not support separate connection for notification then the following function of DeviceContext can be used for sending a notification event: "public abstract void SendResponse (byte[ ] data)." The function "RaiseManagementEvent" can be called to raise a management event. Moreover, the function "RaiseDiscoveryEvent" can be called for raising a discovery event with given parameters. In another example, the function "public abstract void OnCommand (CommandReceivedEventArgs commandArgs)" can process commands from a provider. The function can be implemented when connection is managed by the device simulator. This can be a callback function for device simulator when it receives some command from the provider side.

The following pseudo code can be a callback class for using functionalities provided by the device simulator framework. The device translator writer does not need to implement the following:

```
public abstract class DeviceContext
{
    public abstract DeviceOperationContext
    DeviceOperationContext { get;}
    public abstract LogicalDeviceInformation DeviceInformation { get;}
    public abstract string DeviceName { get; set;}
    public abstract string DeviceId { get; set;}
    public abstract void StartListeningOn(Transport transport,
TransportSettings transportSettings);
    public abstract void StopListeningOn(Transport transport,
TransportSettings transportSettings);
    public abstract void SendResponse(byte[ ] data);
    public abstract void LogMessage(Level logLevel, string message);
}
```

The function "DeviceOperationContext" can be used for advanced device operations such as tag management, read filters management, device properties management, etc. "LogicalDeviceInformation" contains information on transport settings and device name. The "DeviceName" can represent the physical name of the device. "DeviceID" can represent hardware identification for the device and manipulation of such is not recommended. The function "StartlisteningOn" can open a TCP server and start listening for TCP client (e.g. connection from provider side). It is to be appreciated and understood that TCP is only one example and the claimed subject matter is not so limited. For instance, other connections can be used such as, but not limited to, HTTP, serial, Blue Tooth, etc.). The TCP connection can be closed with the function "StopListeningOn." This can disconnect TCP client if connected and stop listening for new clients. The function "SendResponse" can send a message to provider such as if the provider is connected to simulator, then this technique can send a message thereto. The function "LogMessage" can be employed to log information associated with the device simulator 402.

The following pseudo code can be implemented for DeviceOperationContext that is used for managing higher level device operations such as, but not limited to, managing tags, read filters, and IO ports. The device translator writer need not implement this. Reference to this class instance can be obtained from DeviceContext class which can be passed while loading the device translator. For instance, "public abstract DeviceOperationContext DeviceOperationContext {get;}" can be implemented. The following code is an example of the class DeviceOperationContext:

```
public abstract class DeviceOperationContext
{
    public abstract List<DeviceCapability> DeviceCapabilities { get;set; }
    public abstract PropertyProfile DefaultPropertyProfile { get; set;}
    public abstract Dictionary<string,Dictionary<PropertyKey,
PropertyMetaData>> PropertyMetaDatas { get; set;}
    public abstract List<string> SourceNameList { get; set;}
    public abstract bool Connected { get; set;}
    public abstract Dictionary<TagKey,TagInformation>
GetAllActiveTags( );
    public abstract Dictionary<TagKey,TagInformation>
GetActiveTagInfo(byte[ ] tagId);
    public abstract TagInformation GetActiveTagInfo(TagKey
tagTrackingKey);
    public abstract void UpdateActiveTagInfo(TagKey tagTrackingKey,
TagInformation tagInfo);
    public abstract void AddActiveTag(TagInformation tagInfo);
    public abstract void AddActiveTag(TagKey tagTrackingKey,
TagInformation tagInfo);
    public abstract void RemoveActiveTag(TagKey tagTrackingKey);
    public abstract void RemoveAllActiveTags( );
    public abstract void SetPropertyValue(PropertyKey propertyKey, string
propertyValue);
    public abstract void SetPropertyValue(string sourceName, PropertyKey
propertyKey, string propertyValue);
    public abstract string GetPropertyValue(PropertyKey propertyKey);
    public abstract string GetPropertyValue(string sourceName,PropertyKey
propertyKey);
    public abstract PropertyProfile GetDevicePropertyProfile( );
    public abstract PropertyProfile GetSourcePropertyProfile(string
sourceName);
    public abstract void SetDevicePropertyProfile(PropertyProfile
propertyProfile);
    public abstract void SetSourcePropertyProfile(string sourceName,
PropertyProfile propertyProfile);
    public abstract void Reboot( );
    public abstract void ReconnectWithDeviceClient( );
    public abstract string GetUserId( );
    public abstract string GetPassword( );
    public abstract void SetIOConfiguration(IOPortConfiguration ioConfig);
    public abstract IOPortConfiguration GetIOConfiguration(string
ioPortName);
    public abstract List<IOPortConfiguration> GetAllIOPorts( );
    public abstract void AddReadFilter(BitMaskReadFilter readFilter);
    public abstract void RemoveReadFilter(BitMaskReadFilter readFilter);
    public abstract List<BitMaskReadFilter> GetAllReadFilters( );
    public abstract void RemoveAllReadFilters( );
    public abstract bool FilterTagId(string tagIdString);
}
```

The first set of functions can relate to properties. "List<DeviceCapability>" can provide a list of device capabilities supported by the device. The function "PropertyProfile Default PropertyProfile" can be used to manage default property of the device. A function "public abstract Dictionary<string, Dictionary<PropertyKey, PropertyMetaData>>PropertyMetaDatas {get; set;}" can handle to manage property meta data's for device.

"List<string>SourceNameList" can handle to manage source name list. Moreover, the function "public abstract bool Connected" can handle to manage connection status of a device. Such function can be changed to true whenever a device gets connected and vice versa.

The following functions can be associated with a tag management. The device simulator can manage a dictionary of active tags. Each tag can be identified by a key. Active tag can be referred to as a tag which is in range of a device. Deletion of an active tag from list can refer to removing the tag from the device's range. The function "Dictionary<TagKey, TagInformation>GetAllActiveTags( )" can return the dictionary containing all tags. The function "GetActiveTagInfo" can return all tags have given tag identification. The function "GetActiveTagInfo(TagKey tagTrackingKey)" can get information of given tag identified with tagTrackingKey. The information of a tag can be updated utilizing the function "UpdateActiveTagInfo." The function "AddActiveTag" can be utilized to add a new active tag with the tag key as TagId. Similarly, a new active tag with a given key can be added with "AddActiveTag(TagKey tagTrackingKey, TagInformation tagInfo)." The function "RemoveActiveTag" can be implemented to remove details about a given tag. Moreover, the function "RemoveAllActiveTags" can remove all active tags.

The next series of functions can relate to property management. The function "SetPropertyValue" can be used to set the property value for given device property name. The function can be used to set the property value for given source property name such as "SetPropertyValue(string sourceName, PropertyKey propertyKey, string propertyValue)." The function "GetPropertyValue" can be utilized to return a property value of given device property. The function can be further utilized to return property value of a given source property such as the following: GetPropertyValue(string sourceName, PropertyKey propertyKey). The following function can be implemented to return the current property profile of device: PropertyProfile GetDevicePropertyProfile( )." The property profile of device can get updates after each set property command. The function "GetSourcePropertyProfile" can return the current property profile of source. The property profile of source can be updated after each set property command on source. The function "SetDevicePropertyProfile" can set new device property profiles. The get property command can reflect the updated values. The following code can set property profile for given source: SetSourcePropertyProfile.

The following pseudo code and/or functions relate to connection management within the class DeviceOperationContext. The function "Reboot( )" can close all connection and re-load the device translator. The following pseudo code can disconnect device client and start waiting for a new client: ReconnectWithDeviceClient. DeviceOperationContext can include authentication management. For instance, the function "GetUserId" can return user identification for the current device. The function "GetPassword( )" can return a password for the current device. The password can be, for instance, a simple string with no encryption and/or a complex string with encryption.

The top level object DeviceOperationContext can further include IO port management. The function "SetIOConfiguration" can add and/or update a given IO port. The following function can return IO port configuration for given port name: GetIOConfiguration. In addition, the function "GetAllIOPorts" can provide a list of all configured IO ports. DeviceOperationContext can include read filter management. In one example, the device simulator can include BitMask filters. The functions "AddReadFilter" can add a read filter. The function "RemoveReadFilter" can remove a read filter, wherein all earlier filters which match given filter pattern can be removed. Moreover, the function "GetAllReadFilters" can return a list of all added filters. The pseudo code "FilterTagId" can check if a given tag identification is able to pass all filters or not. It can return TRUE if a tag is to be filtered.

The claimed subject matter can also include a StandardDeviceTranslator which derives from the DeviceTranslator class. Functionalities regarding discovery events and management events are removed for this class. If device translator is written for running device provider transport protocol then this class should be implemented rather than the DeviceTranslator.

In addition, the following pseudo code can be implemented that relates to tag configuration in accordance with one aspect of the claimed subject matter:

```
public class TagInformation
{
    public Tag Tag
    { get; set;}
    public bool IsDataLocked
    { get; set; }
    public bool IsIdLocked
    { get; set;}
    public bool Killed
    { get; set;}
    public byte[ ] KillCode
    { get; set;}
    public byte[ ] PassCode
    { get; set; }
    public TagMetaData TagMetaData
    {Get; set;}
    public Dictionary<string, byte[ ]> Barcodes
    {Get; set;}
    public Dictionary<string, int> FieldIncrements
    {get; set;}
    public Dictionary<string, byte[ ]> TextFields
    {get;set;}
    public Dictionary<VendorSpecificDataKey,
    string> VendorSpecificDatas
    {get; set;}
}
```

Furthermore, the following pseudo code can be utilized in relation to IO port configuration:

```
public class IOPortConfiguration
{
    public string Name
    {get;set;}
    public byte[ ] InputValue
    {get;set;}
    public byte[ ] OutputValue
    {get; set;}
}
```

Figure 5:
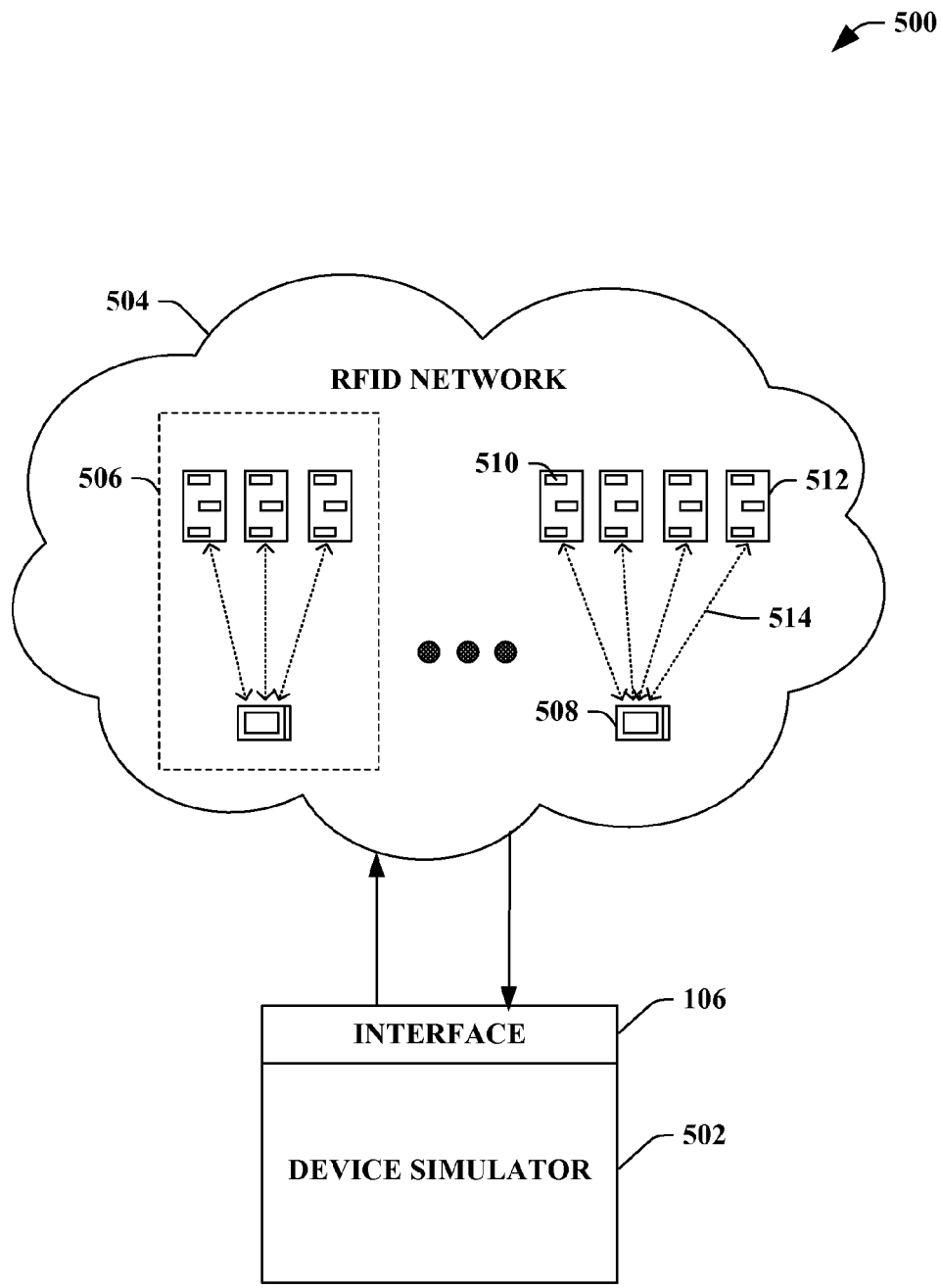
FIG. 5 illustrates a block diagram of an exemplary system that facilitates simulating an RFID device associated with an RFID network and an RFID process.

FIG. 5 illustrates a system 500 that facilitates simulating a physical device within an RFID network. The system 500 can include device simulator 502 that can mimic a physical device within the RFID network 504 to provide testing and/or trouble-shooting of devices. The device simulator 502 can mimic and/or replicate the existence of a physical device within the RFID network 504. The devices can be grouped, wherein the grouping of devices within the RFID network 504 can be based on at least one of the following: device physical location, device functionality, device security level, process device association, make and/or model of device, type of device, device frequency, etc. By utilizing the group in connection with management/configuration/simulation of the devices within the RFID network 504, device settings, configurations, properties, security settings, process bindings, group membership, rule bindings, etc. can be replicated and/or simulated by the device simulator 502. Furthermore, it is to be appreciated that the device simulator 502 and the RFID network component 504 can be substantially similar to previously described figures.

The RFID network 504 can include a plurality of universes (e.g., sub-systems, RFID networks), wherein a universe is a server of RFID entities. For simplicity, the RFID network 504 illustrates a single universe containing two collections of devices (e.g. device collections), where a first collection 506 is shown. It is to be appreciated that the device collections can correspond to device groups, wherein such collections and/or groups can be based on at least one of the following: device physical location, device functionality, device security level, process device association, make and/or model of device, type of device, device frequency, etc. For instance, an RFID sub-system can be a location wherein the entities involved are related to a substantially similar process. In one example, a sub-system can be a warehouse containing a plurality of receiving and/or shipping dock doors with associated devices. Thus, first collection 506 can be a collection of devices within the specified sub-system. It is to be appreciated a plurality of collection of devices can be implemented. Within a collection of devices, a device 508 can receive an RFID signal 514 from a pallet of goods 512 containing at least one RFID tag 510. It is to be appreciated the pallets and/or goods can be tagged based at least upon user specifications (e.g. single pallets tagged, individual goods tagged, pallets and goods tagged, etc.).

Figure 6:
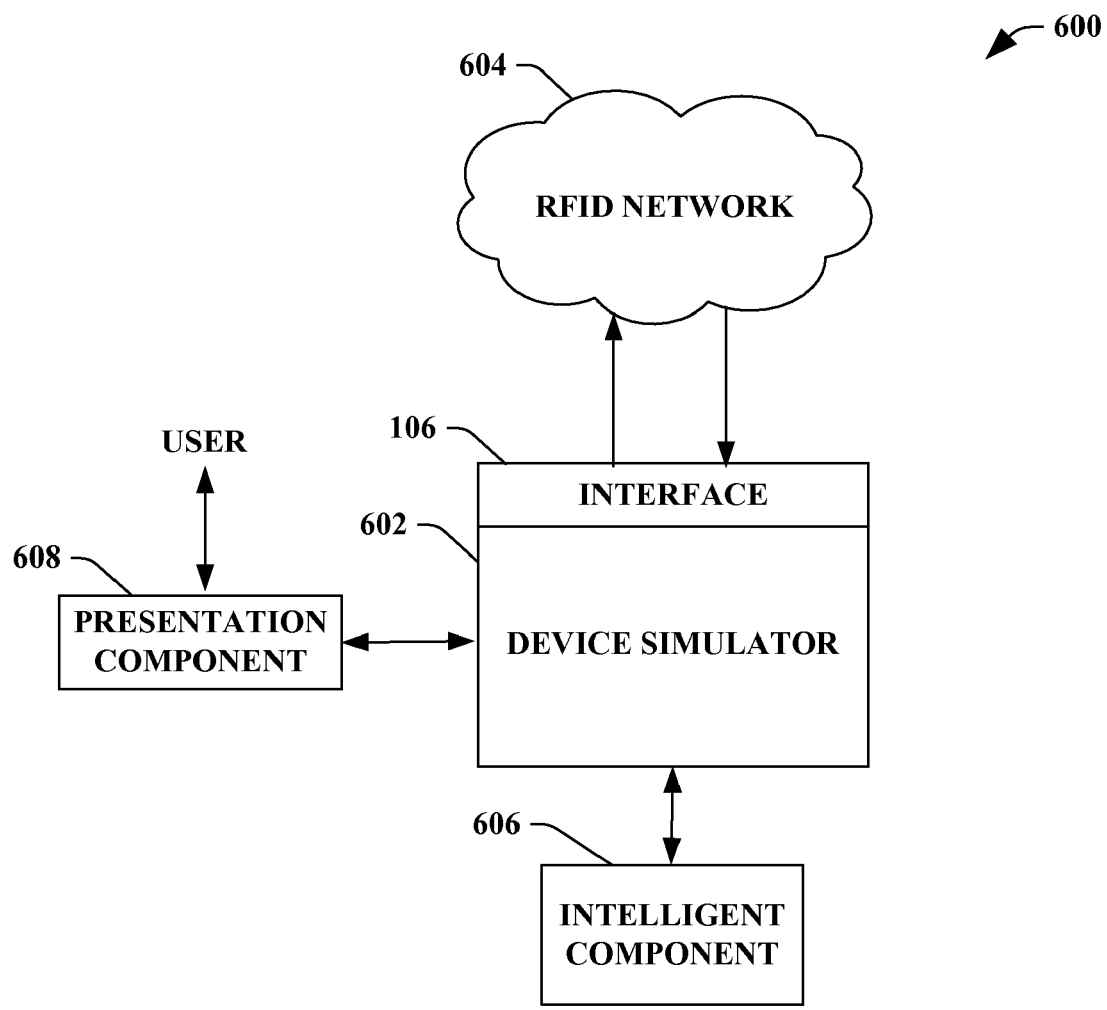
FIG. 6 illustrates a block diagram of an exemplary system that facilitates simulating a device associated with an RFID infrastructure.

FIG. 6 illustrates a system 600 that employs intelligence to facilitate simulating a device associated with an RFID infrastructure. The system 600 can include a device simulator 602, an RFID process 604, and the interface 106 that can all be substantially similar to respective components, simulators, processes, and interfaces described in previous figures. The system 600 further includes an intelligent component 606. The intelligent component 606 can be utilized by the device simulator 602 to facilitate replicating the existence of a physical device by utilizing a virtual device. For example, the intelligent component 606 can infer the device to be simulated based on the RFID network physical architecture, process manipulations based on device simulations, device settings, device wire protocols, device configurations in accordance with the RFID process, device settings in accordance with existing physical devices, etc.

It is to be understood that the intelligent component 606 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The device simulator 602 can further utilize a presentation component 608 that provides various types of user interfaces to facilitate interaction between a user and any component coupled to the device simulator 602. As depicted, the presentation component 608 is a separate entity that can be utilized with the device simulator 602. However, it is to be appreciated that the presentation component 608 and/or similar view components can be incorporated into the device simulator 602 and/or a stand-alone unit. The presentation component 608 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the device simulator 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
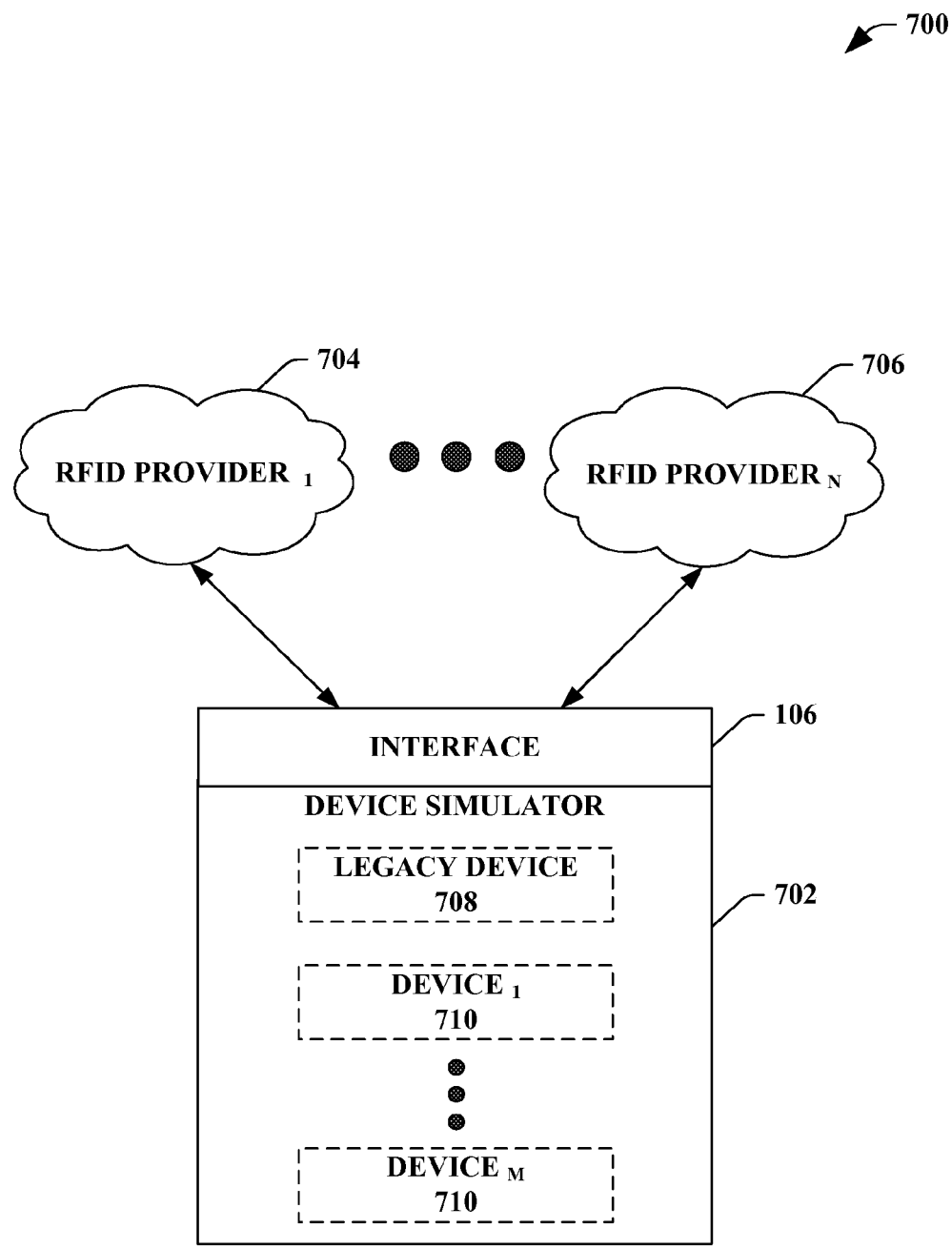
FIG. 7 illustrates a block diagram of an exemplary system that facilitates simulating a plurality of disparate devices associated with a plurality of RFID providers.

FIG. 7 illustrates a system 700 that facilitates simulating a plurality of disparate devices associated with a plurality of RFID providers. The system 700 can include a device simulator 702 that can provide a virtual representation of a physical device. The device simulator 702 can simulate the presence of a device by emulating at least one of the following: device settings (e.g., power levels, frequencies, etc.), device configurations, tag data readings, process interaction, an RFID process (not shown) role, a tag notification, management events, commands related to a particular device, a device property, a tag management, a TCP connection management, a read filter management, an IO ports management, etc. Moreover, it is to be appreciated that the device simulator 702 can be substantially similar to previous device simulators described.

The device simulator 702 can mimic a plurality of devices and/or numerous brands, makes, models, serial numbers, types, functionalities of devices. For example, the device simulator 702 can emulate and/or simulate a legacy device 708 and any number of devices 710 from $device_1$ to $device_M$, where M is an integer. It is to be appreciated that each device that can be simulated by the device simulator 702 can be associated with a respective RFID provider, where there can be any number of providers from $RFID provider_1$ 704 to $RFID provider_N$, where N is an integer. For instance, for the legacy device 708, there can be a respective RFID provider associated thereto. The RFID provider can allow communication to the device with the host (not shown) and/or RFID server (not shown). The RFID providers can be independent hardware vendors that can utilize dynamic-link library (DLL) files. Thus, the device simulator 702 can mimic interaction with the RFID server, host, and/or respective provider without physical presence in an RFID network and/or physical architecture.

Figure 8:
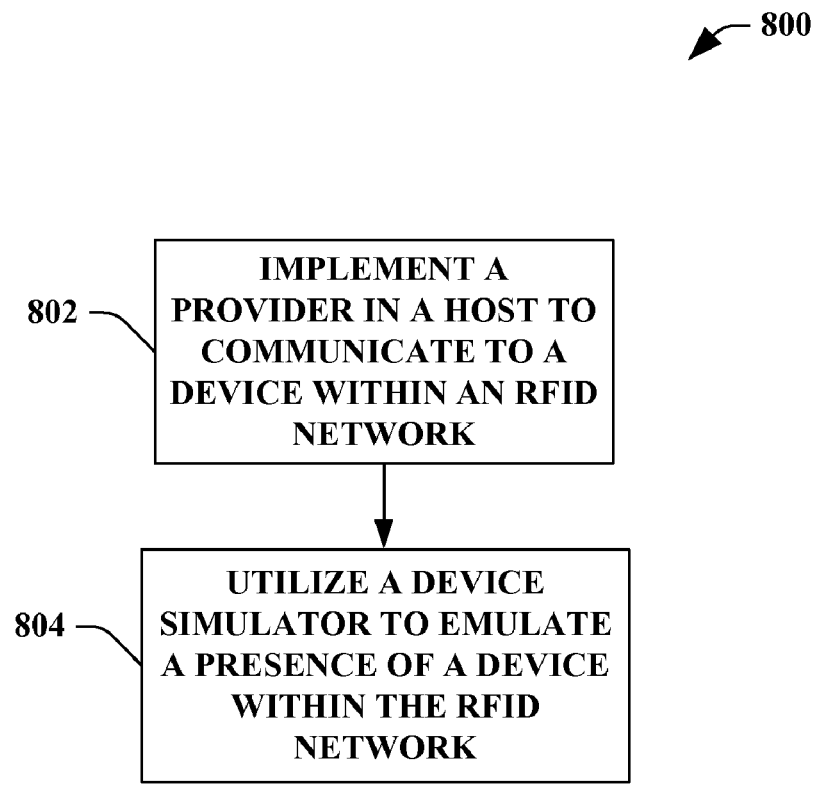
FIG. 8 illustrates an exemplary methodology for simulating a device associated with an RFID infrastructure.
Figure 9:
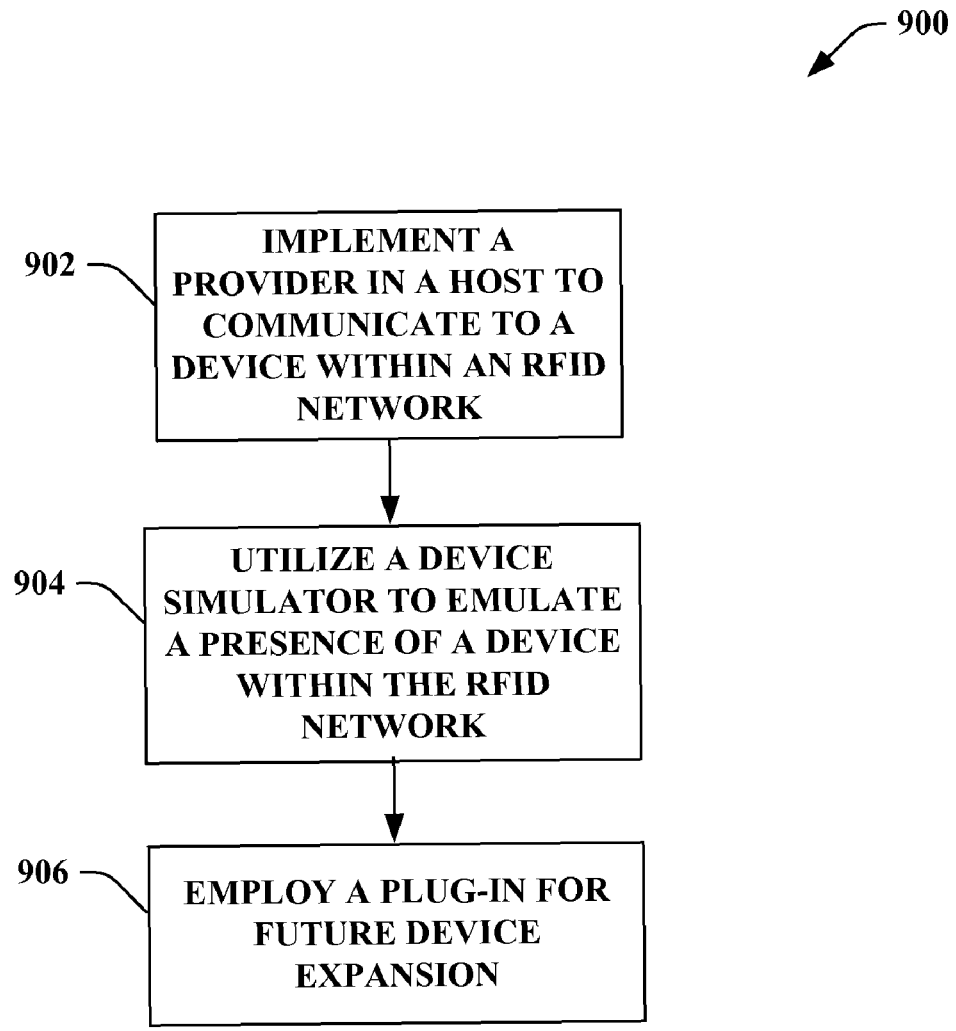
FIG. 9 illustrates an exemplary methodology that facilitates employing a virtual device among physical devices that allows for expansion for future devices.
Figure 10:
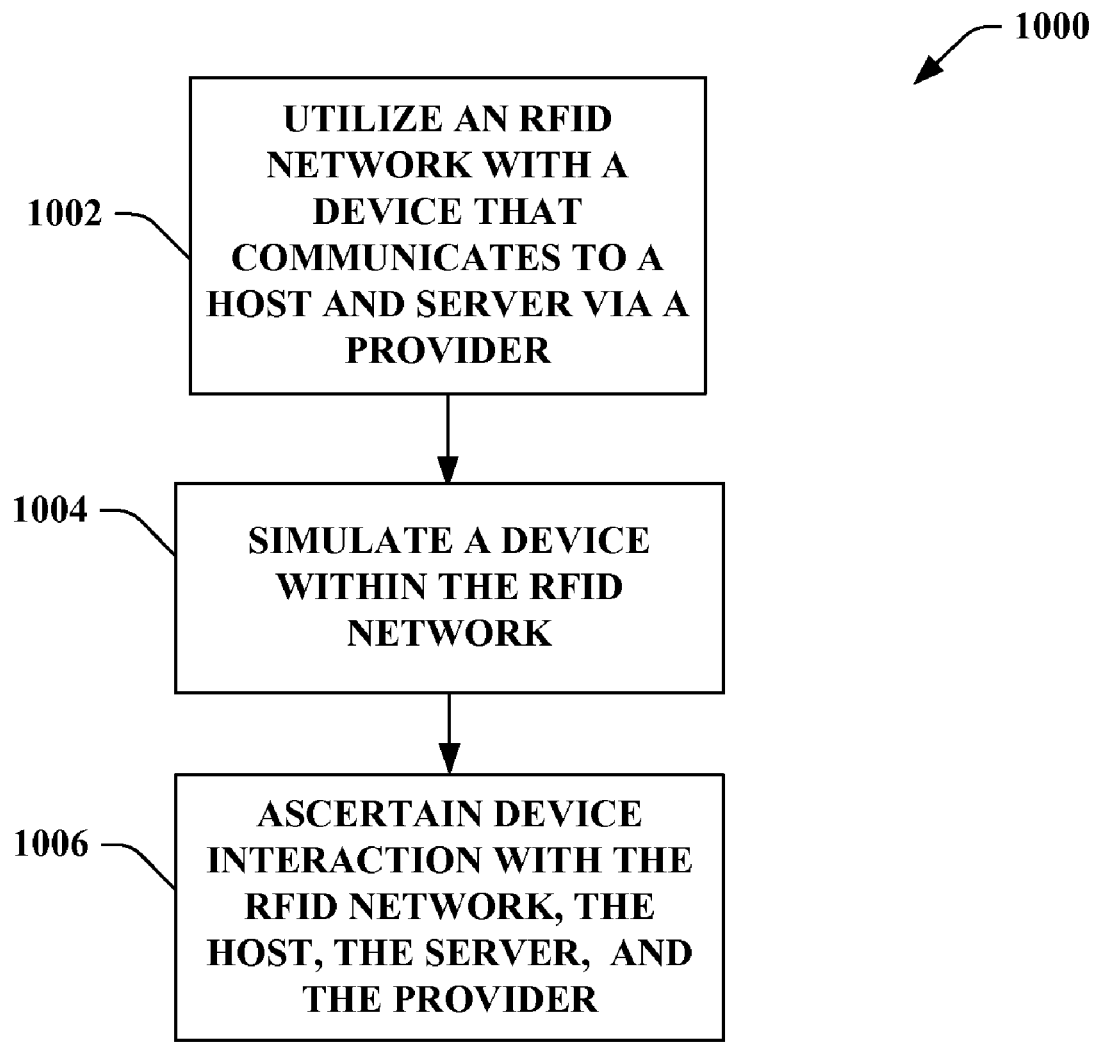
FIG. 10 illustrates an exemplary methodology for simulating a device associated with an RFID infrastructure.

FIGS. 8-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 that facilitates simulating a device associated with an RFID infrastructure. At reference numeral 802, a provider can be implemented within a host to communicate to a device within an RFID network. It is to be appreciated that the device within the RFID network can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. The device can receive a signal from, for instance, at least one tag and/or a plurality of tags. In one example, the tag can contain an antenna that provides reception and/or transmission to radio frequency queries from the device.

The RFID network can include at least one device that is associated with at least one RFID process. It is to be appreciated that the RFID process can utilize any suitable number of devices within the RFID network. An RFID process can be related to a particular RFID sub-system (e.g., an RFID server, RFID network, etc.) that is an uber or high-level object that forms together various entities to create a meaningful unit of execution. The RFID process can be an outbound process (e.g. pick, pack, shipping scenario, etc.), a manufacturing process, a shipping process, a receiving process, tracking, data representation, data manipulation, data application, security, etc.

At reference numeral 804, a device simulator can be utilized to emulate a presence of a device within the RFID network and/or to interact with the provider within the host. The device simulator can be a virtual representation of a physical device to simulate the existence of such device. For example, the device simulator can mimic any device settings (e.g. power levels, frequencies, etc.), device configurations, tag data readings, process interaction, an RFID process (not shown) role, a tag notification, management events, commands related to a particular device, a device property, a tag management, a TCP connection management, a read filter management, an IO ports management, etc. In addition, the device simulated can be, but not limited to, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Moreover, it is to be appreciated that the device simulator can be utilized among other physically present devices. Thus, a physical device within the RFID network and a device simulator can interact among each other to provide data and/or feedback.

FIG. 9 illustrates a methodology 900 for employing a virtual device among physical devices that allows for expansion for future devices. At reference numeral 802, a provider can be implemented within a host to communicate to a device within an RFID network. The provider within the host can provide communication the device by utilizing a DLL file written by, for instance, an independent hardware vendor. It is to be appreciated that the device and/or the device to be simulated within the RFID network can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system.

At reference numeral 904, a device simulator can be utilized to emulate a presence of a device within the RFID network. The device simulator can mimic a device to replicate such presence and/or interaction with the RFID network, other physical devices, an RFID process, the host, the RFID server, etc. Moreover, the simulated device can provide insight on the advantages of deployment of disparate devices, settings, configurations, wire protocols, functionality, processes, network configurations, server configuration, etc. In one example, the device simulator can utilize a universal port that allows communication with a physical device. The communication can facilitate receipt of data related to mimicking the physical device connected thereto.

At reference numeral 906, a plug-in can be employed to allow for future device expansion. In other words, the device simulator can be enhanced by utilizing a plug-in to update and/or adapt to various devices that come into existence. The plug-in can allow for upgrades and/or version updates that can include, but are not limited to including, new device simulators, new device settings (e.g. power levels, frequencies, etc.), new device configurations, updated tag data readings, new process interaction, revised an RFID process (not shown) role, updated tag notification, new management events, new commands related to a particular device, a new device property, a new tag management, new device connection management, new TCP connection management, new read filter management, new IO ports management, etc.

FIG. 10 illustrates a methodology that facilitates simulating a device associated with an RFID infrastructure. At reference numeral 1002, an RFID network can be utilized with a device that communicates to a host and/or server via a provider. The RFID network can be a physical architecture with devices that can wirelessly communicate with a tag. Moreover, the devices can communicate with the host and/or server by utilizing respective device providers, wherein a provider can be related to a particular type, make, model, brand, etc. of device.

At reference numeral 1004, the device within the RFID network can be simulated. It is to be appreciated that a device need not be physically present in the RFID network at any time to be simulated. For example, the device simulator can emulate any device settings (e.g. power levels, frequencies, etc.), device configurations, tag data readings, process interaction, an RFID process (not shown) role, a tag notification, management events, commands related to a particular device, a device property, a tag management, a TCP connection management, a read filter management, an IO ports management, etc. At reference numeral 1006, the device interaction can be ascertained in relation to at least one of the RFID network, the host, the server, and/or the provider. Thus, by simulating a device, any aspect related thereto can be tested and/or simulated to ensure reliability, capability, and optimization of the RFID infrastructure.

Figure 11:
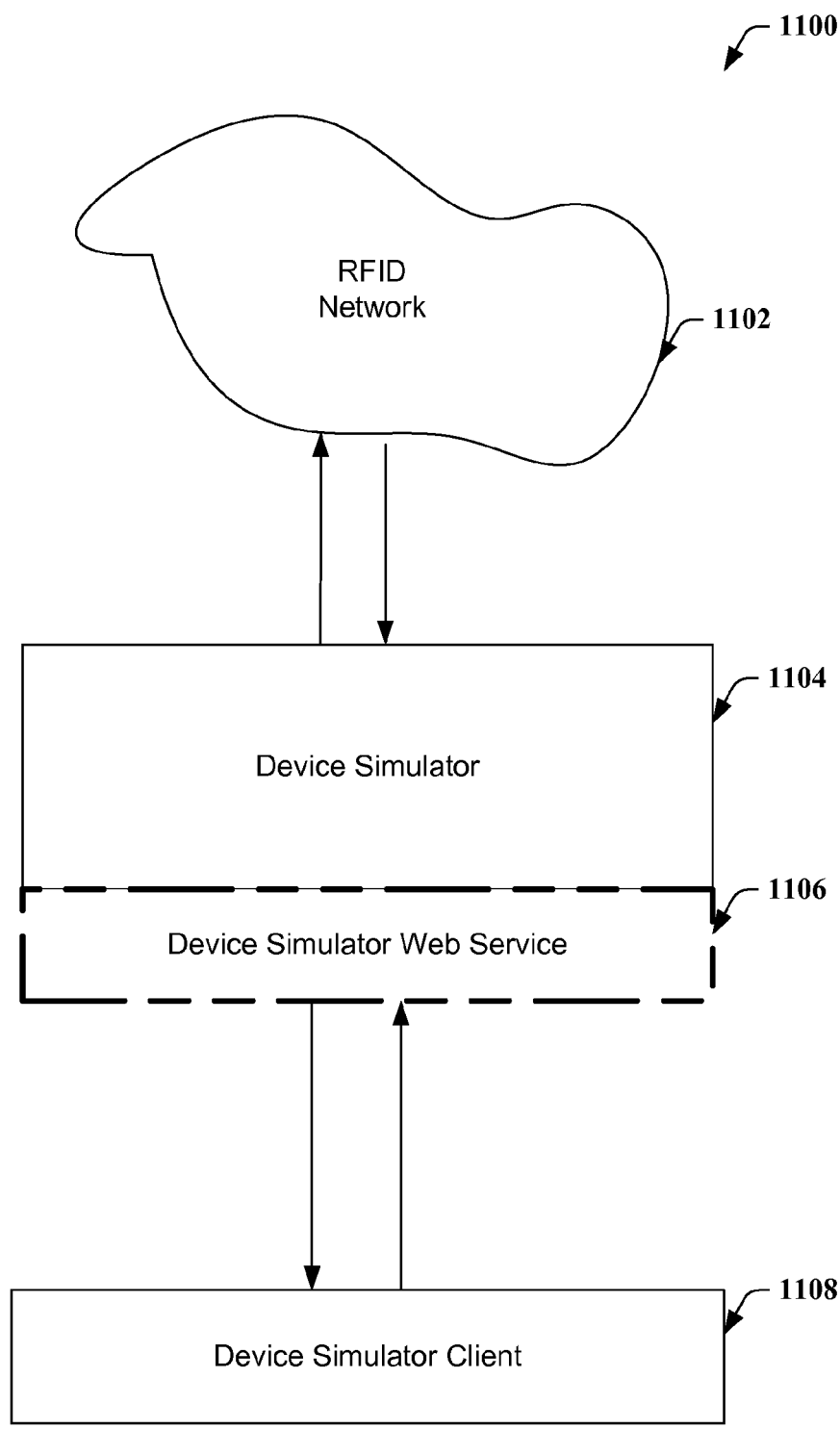
FIG. 11 illustrates a block diagram of an exemplary system that facilitates controlling a device simulator via a web service.

Turning briefly to FIG. 11, a system 1100 is illustrates that facilitates controlling a device simulator via a web service. The system 1100 can include a device simulator 1104 that can simulate any RFID device of any type, wherein the simulation is that of a virtual representation of the physical device. The device simulator 1104 can utilize a virtual device to represent a physical representation of a device within an RFID network 1102. The RFID network 1102 can be a physical architecture related to RFID technology including a device that receives data from a tag. Thus, the device simulator 1104 can represent/replicate an additional device, a disparate device, a plurality of devices (similar and/or disparate to the device), and/or any combination thereof within the RFID network 1102. The RFID network 1102 can include at least one RFID service and at least one provider. The device simulator 1104 can be controlled via a device simulator web service 1106 (also referred to as web service 1106). A device simulator client 1108 can connect to the device simulator 1104 through the web service 1106 to allow device manipulations and/or configuration changes. For instance, the device simulator client 1108 can change a device setting, tag information, event management, raise discovery events, raise management events, etc.

Figure 12:
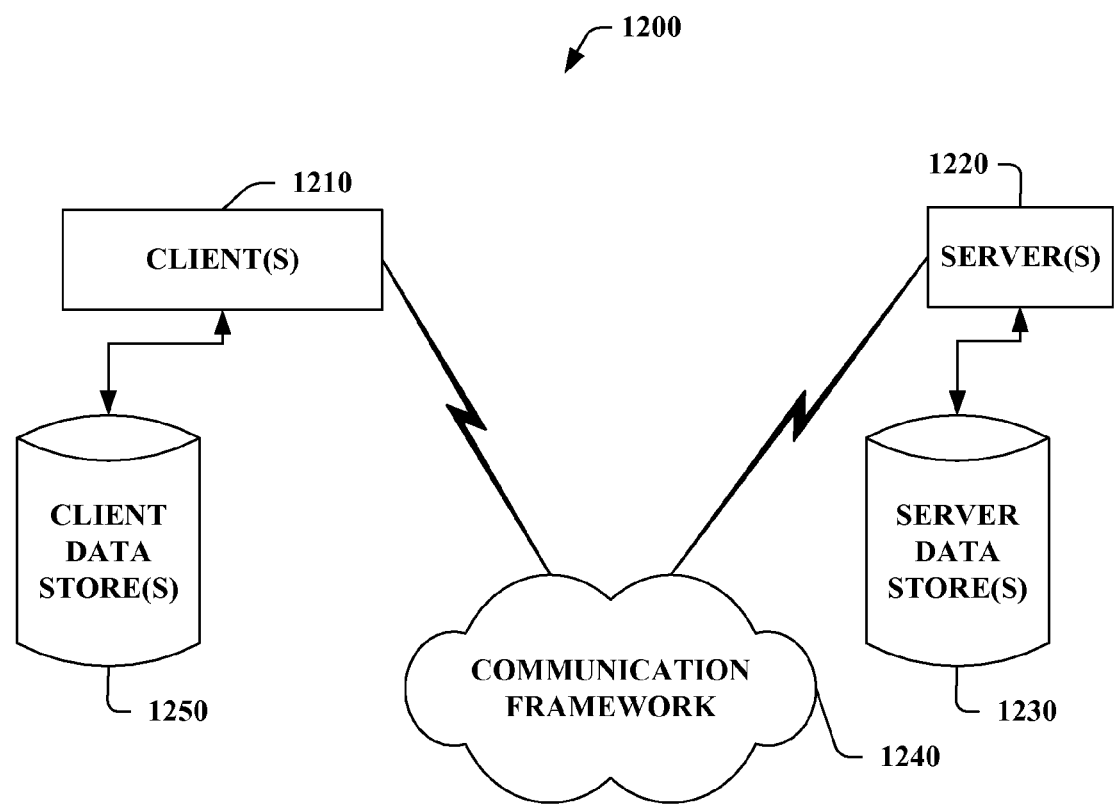
FIG. 12 illustrates an exemplary networking environment, wherein the novel aspects of the claimed subject matter can be employed.
Figure 13:
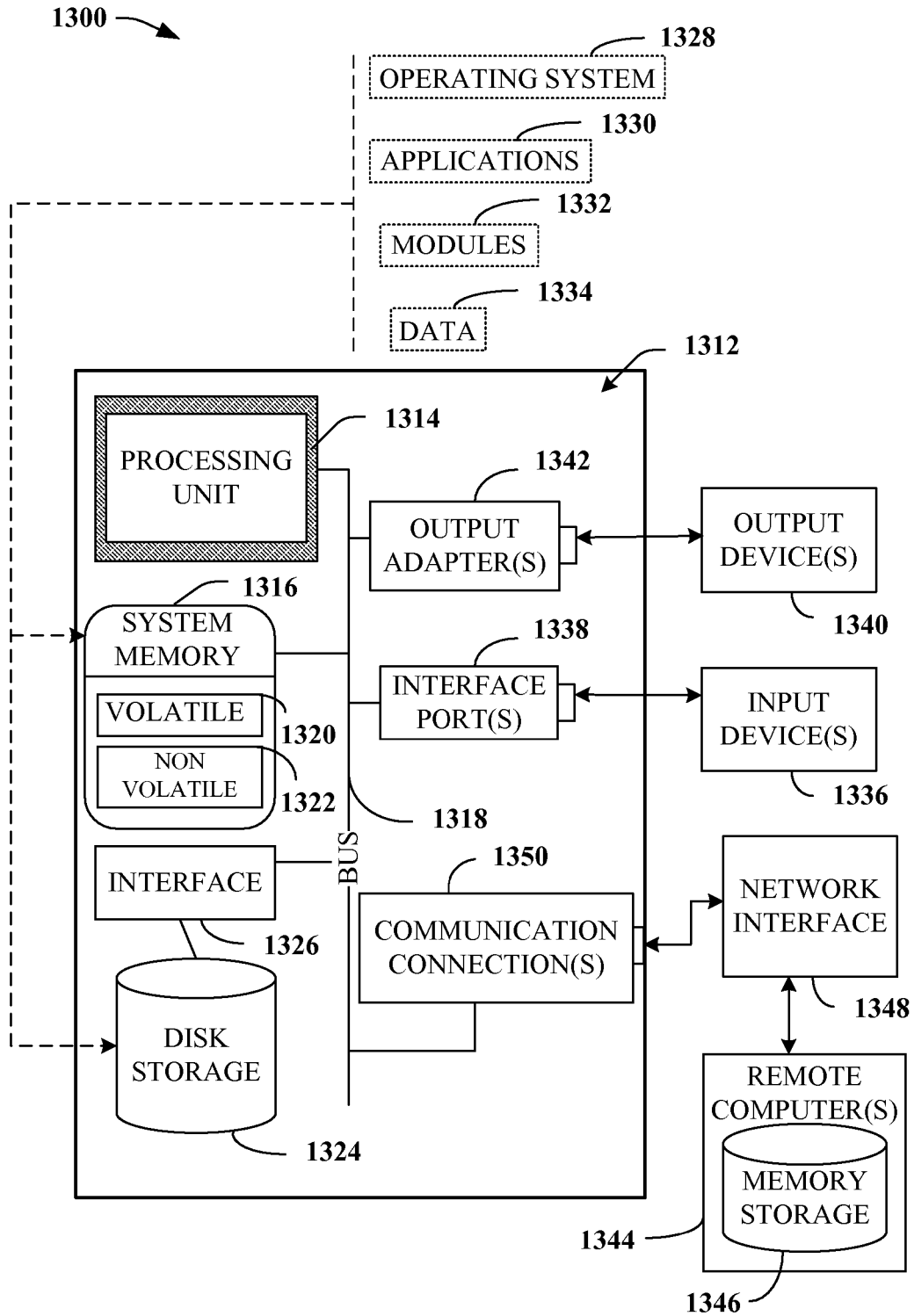
FIG. 13 illustrates an exemplary operating environment that can be employed in accordance with the claimed subject matter.

In order to provide additional context for implementing various aspects of the claimed subject matter, FIGS. 12-13 and the following discussion is intended to provide a brief, general description of a suitable computing environment in which the various aspects of the subject innovation may be implemented. For example, a device simulator that simulates a physical device within an RFID network, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 12 is a schematic block diagram of a sample-computing environment 1200 with which the claimed subject matter can interact. The system 1200 includes one or more client(s) 1210. The client(s) 1210 can be hardware and/or software (e.g., threads, processes, computing devices). The system 1200 also includes one or more server(s) 1220. The server(s) 1220 can be hardware and/or software (e.g., threads, processes, computing devices). The servers 1220 can house threads to perform transformations by employing the subject innovation, for example.

One possible communication between a client 1210 and a server 1220 can be in the form of a data packet adapted to be transmitted between two or more computer processes. The system 1200 includes a communication framework 1240 that can be employed to facilitate communications between the client(s) 1210 and the server(s) 1220. The client(s) 1210 are operably connected to one or more client data store(s) 1250 that can be employed to store information local to the client(s) 1210. Similarly, the server(s) 1220 are operably connected to one or more server data store(s) 1230 that can be employed to store information local to the servers 1220.

With reference to FIG. 13, an exemplary environment 1300 for implementing various aspects of the claimed subject matter includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), or flash memory. Volatile memory 1320 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in the suitable operating environment 1300. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the claimed subject matter can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates simulating at least one radio frequency identification (RFID) device, comprising:
   an interface configured to physically connect to a device and to receive data from the device via a physical connection between the interface and the device; and
   a device simulator configured to clone the device as a function of the data received from the device via the physical connection to create a virtual replication of the device within an RFID network.

2. The system of claim 1, wherein the device simulator is configured to facilitate having the virtual replication simulate at least one of a setting on the physical device, a wire protocol, a role within an RFID process, an interaction with the RFID network, a communication with a provider, or a configuration related to the physical device.

3. The system of claim 2, wherein the RFID process is a high-level object that forms a unit of execution that relates to at least one of the following: an outbound process; a manufacturing process; a shipping process; a receiving process; a tracking process; a data representation process; a data manipulation process; a security process; or a process utilizing one of an RFID device service, a device collection, a tag read, an event, an event queue, a tag write, a device configuration, or a number count.

4. The system of claim 1, wherein the RFID network comprises a collection of devices that form a sub-system which includes:
   an RFID reader configured to receive an RFID signal; and
   an RFID tag configured to transmit data related to the RFID tag to at least one of the collection of devices.

5. The system of claim 1, wherein the device is at least one of an RFID reader, an RFID writer, an RFID printer, a printer, a reader, a writer, an RFID transmitter, an antenna, a sensor, a real-time device, an RFID receiver, a real-time sensor, a device extensible to a web service, or a real-time event generation system.

6. The system of claim 1, wherein the virtual replication is of at least one of an RFID reader, an RFID writer, an RFID printer, a printer, a reader, a writer, an RFID transmitter, an antenna, a sensor, a real-time device, an RFID receiver, a real-time sensor, a device extensible to a web service, or a real-time event generation system.

7. The system of claim 1, wherein the device simulator is configured to simulate a plurality of devices from a plurality of disparate vendors simultaneously.

8. The system of claim 1, wherein the device simulator is configured to simulate at least one of the following: a device setting; a device power level; a device frequency; a device configuration; a tag data reading; a tag notification; a management event; a command related to the device; a device property; a tag management; a connection management; a TCP connection management; an HTTP connection management; a Blue Tooth connection management; a read filter management; or an IO port management.

9. The system of claim 1, further comprising a plug-in configured to expand the device simulator to facilitate a virtual representation of a disparate device.

10. The system of claim 9, wherein the plug-in is configured to receive data related to the disparate device from a third party.

11. The system of claim 9, wherein the plug-in is configured to provide at least one of an upgrade, a version, a new device, an expansion pack, a template of devices, or a new wire protocol.

12. The system of claim 1, wherein the device simulator is configured to simultaneously employ a plurality of virtual replications for a plurality of disparate devices.

13. The system of claim 1, wherein the device simulator is configured to include at least one of a DeviceTranslator object, a DeviceContext object, or a DeviceOperationContext object.

14. The system of claim 1, wherein the device simulator is configured to process a request for employing the virtual replication for a provider related to the device.

15. The system of claim 1, further comprising a web service configured to facilitate changing at least one of a device setting, a tag information, or a notification process.

16. A computer-implemented method that facilitates simulating at least one radio frequency identification (RFID) device, comprising:
   physically connecting a device to a device simulator, wherein a physical connection between the device and the device simulator is established via a port on the device simulator;
   receiving data from the device via the physical connection; and
   cloning the device with the device simulator based at least in part on the data received from the device via the physical connection.

17. The method of claim 16, further comprising employing a plug-in to facilitate a future device expansion.

18. The method of claim 16, further comprising ascertaining a device interaction with at least one of an RFID network, a host, an RFID server, or a host provider.

19. A computer-readable storage medium that facilitates simulating at least one radio frequency identification (RFID) device, comprising
   computer-readable instructions, the computer-readable instructions including instructions for causing at least one processor to perform at least the following acts:
      receiving data from a device via a physical connection between the device and a device simulator;
      cloning the device, wherein the cloning is based at least in part on the data received from the device via the physical connection;
      simulating the device with a virtual representation within an RFID network, wherein the virtual replication is based on the cloning of the device; and
      employing a plug-in to expand the virtual representation to include a simulation of one or more additional devices substantially similar to at least one of the device or a disparate device within the RFID network.

* * * * *